United States Patent
Song et al.

(10) Patent No.: US 11,305,605 B2
(45) Date of Patent: Apr. 19, 2022

(54) TORSION BEAM OF COUPLED TORSION BEAM AXLE

(71) Applicants: Hyundai Motor Company, Seoul (KR); Kia Motors Corporation, Seoul (KR)

(72) Inventors: Ji Eun Song, Daejeon (KR); Hee Gon Kang, Anyang-si (KR); Moon Won Kang, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/028,671

(22) Filed: Sep. 22, 2020

(65) Prior Publication Data
US 2021/0300142 A1 Sep. 30, 2021

(30) Foreign Application Priority Data
Mar. 31, 2020 (KR) .................. 10-2020-0038812

(51) Int. Cl.
*B60G 21/05* (2006.01)
(52) U.S. Cl.
CPC ........ *B60G 21/051* (2013.01); *B60G 2206/20* (2013.01)
(58) Field of Classification Search
CPC ....... E05F 15/652; E05F 15/655; E05F 15/73; E05F 2015/767; B60J 5/102;
(Continued)

(56) References Cited

U.S. PATENT DOCUMENTS

| 4,165,098 A | * | 8/1979 | Wagner | ............... B60G 21/051 267/191 |
| 7,357,461 B2 | * | 4/2008 | Zuber | ..................... B60G 7/02 280/124.153 |

(Continued)

FOREIGN PATENT DOCUMENTS

| CN | 108944331 A | 12/2018 |
| DE | 10 2004 003 152 A1 | 8/2005 |

(Continued)

*Primary Examiner* — Toan C To
(74) *Attorney, Agent, or Firm* — Morgan, Lewis & Bockius LLP

(57) ABSTRACT

A torsion beam of a coupled torsion beam axle may include an external beam having a first cross-section in which an external protrusion of a middle end portion of the external beam is formed to protrude toward upward in a longitudinal direction of the external beam, and external skirt portions are vertically extended along the longitudinal direction at both end portions of the external protrusion; and an internal beam having a second cross-section in which an internal protrusion of a middle end portion in the internal beam is inserted into the external beam to face the external protrusion of the external beam, and internal skirt portions are extended in a vertical direction at both end portions of the internal protrusion, and each external surface of the internal skirt portions and each internal surface of the external skirt portions are surface-bonded in a mutually matched state. A gap is formed between an external surface of the internal protrusion and an internal surface of the external protrusion to form a closed cross-section.

15 Claims, 4 Drawing Sheets

(58) Field of Classification Search
CPC .......... B60G 2200/20; B60G 2200/21; B60G 2206/20; B60G 2206/8102; B60G 2206/8201; E05Y 2201/434; E05Y 2900/546
See application file for complete search history.

(56) References Cited

U.S. PATENT DOCUMENTS

| | | | | |
|---|---|---|---|---|
| 2003/0044632 | A1* | 3/2003 | Schonleber ......... | B62D 27/026 428/595 |
| 2007/0069496 | A1* | 3/2007 | Rinehart ............... | B21D 53/88 280/124.166 |
| 2013/0214504 | A1* | 8/2013 | Ohdo .................... | B60G 21/051 280/124.106 |
| 2016/0016453 | A1* | 1/2016 | Kale .................... | B60G 21/051 280/124.166 |
| 2016/0068035 | A1* | 3/2016 | Rao ...................... | B23K 26/21 280/124.166 |
| 2018/0029434 | A1* | 2/2018 | Chelikani ............. | B60B 35/125 |
| 2019/0255904 | A1* | 8/2019 | Perez ................... | B60J 5/102 |

FOREIGN PATENT DOCUMENTS

| | | |
|---|---|---|
| KR | 10-2012-0057143 | 6/2012 |
| WO | WO 2014/172437 A1 | 10/2014 |

\* cited by examiner

TORSION BEAM OF COUPLED TORSION BEAM AXLE

CROSS REFERENCE TO RELATED APPLICATION

The present application claims priority to Korean Patent Application No. 10-2020-0038812, filed Mar. 31, 2020, which is hereby incorporated by reference for all purposes as if fully set forth herein.

BACKGROUND OF THE INVENTION

Field of the Invention

The present invention relates to a torsion beam of a coupled torsion beam axle that satisfies durability performance without increasing a weight of a component through structural improvement of the torsion beam.

Description of Related Art

A suspension of a vehicle is an apparatus that prevents damage to a vehicle body or cargo and improves riding comfort by connecting an axle and the vehicle body to prevent vibration or shock received from a road surface from being directly transmitted to the vehicle body when driving, and is classified into a front suspension and a rear suspension.

As a rear suspension for light and semi-medium-sized passenger cars, a coupled torsion beam axle (CTBA) that exhibits relatively high driving stability compared to low unit cost and mass is used.

When pitching occurs in the vehicle body while driving, the coupled torsion beam axle absorbs the pitching through a torsional elastic force of a member.

Furthermore, when the vehicle is turning driving, a displacement difference between the left and right wheels occurs according to a roll behavior of the vehicle, and a torsion bar, which is an intermediate member of the axle, is twisted, improving roll rigidity. As a result, the coupled torsion beam axle is configured to secure turning stability.

A high performance vehicle may secure fast responsiveness in terms of handling due to high roll rigidity characteristics, and in small and medium-sized high performance vehicles, a high rigidity coupled torsion beam axle is essential because a coupled torsion beam axle is applied to the rear wheel.

However, the high rigidity coupled torsion beam axle has a problem in that the durability/strength performance deteriorates as an input load increases, and has a side effect of increasing the weight of the components when the components are increased to increase the rigidity. Accordingly, there is a demand for a lightweight, high rigidity, coupled torsion beam axle structure which may satisfy durability performance without significantly increasing the weight of the components.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a torsion beam of a coupled torsion beam axle that satisfies durability performance without increasing a weight of a component through structural improvement of the torsion beam.

According to various exemplary embodiments of the present invention, a torsion beam of a coupled torsion beam axle includes: an external beam having a first cross-section in which an external protrusion of a middle end portion of the external beam is formed to protrude toward upward in a longitudinal direction of the external beam, and external skirt portions are vertically extended along the longitudinal direction at both end portions of the external protrusion; and an internal beam having a second cross-section in which an internal protrusion of a middle end portion in the internal beam is inserted into the external beam to face the external protrusion of the external beam, and internal skirt portions are extended in a vertical direction at both end portions of the internal protrusion, and each external surface of the internal skirt portions and each internal surface of the external skirt portions are surface-bonded in a mutually matched state, wherein a gap is formed between an external surface of the internal protrusion and an internal surface of the external protrusion to form a closed cross-section.

A welding bonding may be linearly performed along an end portion of the internal skirt portion and the internal surface of the external skirt portion contacting with the end portion of the internal skirt portion, and the external surface of the internal skirt portion and the internal surface of the external skirt portion may be partially welding-bonded in a longitudinal direction thereof.

The external surface of the internal skirt portion and the internal surface of the external skirt portion may be welding-bonded at regular intervals in the longitudinal direction of the internal skirt portion and the external skirt portion.

The external surface of the internal skirt portion and the internal surface of the external skirt portion may be welding-bonded at regular intervals in upper and lower portions in the longitudinal direction of the internal skirt portion and the external skirt portion, and are bonded so that welded positions of the upper and lower portions are staggered with each other.

The external surface of the internal skirt portion and the internal surface of the external skirt portion may be welding-bonded in the longitudinal direction of the internal skirt portion and the external skirt portion, and may be bonded so that a welded range of a center portion of the torsion beam is longer than other welded ranges of both sides of the center portion of the torsion beam.

The external surface of the internal skirt portion and the internal surface of the external skirt portion may be welding-bonded in the longitudinal direction of the internal skirt portion and the external skirt portion, and may not be welded at the center portion of the torsion beam, but be welded only at both sides of the center portion of the torsion beam.

The gap may be formed by offsetting a cross section of the internal protrusion into a shape corresponding to a cross section of the external protrusion.

The gap may be formed between the entire external surface section of the internal protrusion and the entire internal surface section of the external protrusion.

A front surface of the external surface of the internal skirt portion may be in surface-contact with the internal surface of the external skirt portion.

A concave inflection portion in which a direction of bending thereof changes toward an internal side of the internal beam may be formed at a point where the external surface of the internal protrusion and the external surface of the internal skirt portion are connected.

The same cross-sectional section formed by maintaining the same shape of the closed cross-section may be formed at the center portion of the external beam and the internal beam, and variable cross-sectional sections formed by varying the shape of the closed cross-section may be formed at both sides of the same cross-sectional section.

The variable cross-sectional sections may include: a first variable section configured so that one side thereof is connected to a side portion of the same cross-sectional section, and the upper end portion of the internal beam is gradually inclined downward to gradually increase a vertical height of the closed cross-section, and a second variable section configured so that one side thereof is connected to the other side of the first variable section, the upper end portion of the external beam and the upper end portion of the internal beam are formed in a horizontal cross-sectional shape having a width of a predetermined length or more, and the other side thereof is connected to the side surfaces of the trailing arms.

The end portions of the external beam and the internal beam may be formed in a shape surrounding a portion of the side surfaces of the trailing arms, an upper end portion of the end portion of the external beam may be bonded to the upper surfaces of the trailing arms, and an upper end portion of the end portion of the internal beam may be bonded to bottom surfaces of the trailing arms.

A jig hole may be formed in a variable cross-sectional section adjacent to the same cross-sectional section of the upper end portion of the external beam.

A seating surface may be formed on the upper end portion of the internal beam facing the jig hole in a direction perpendicular to an axial direction of the jig hole.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
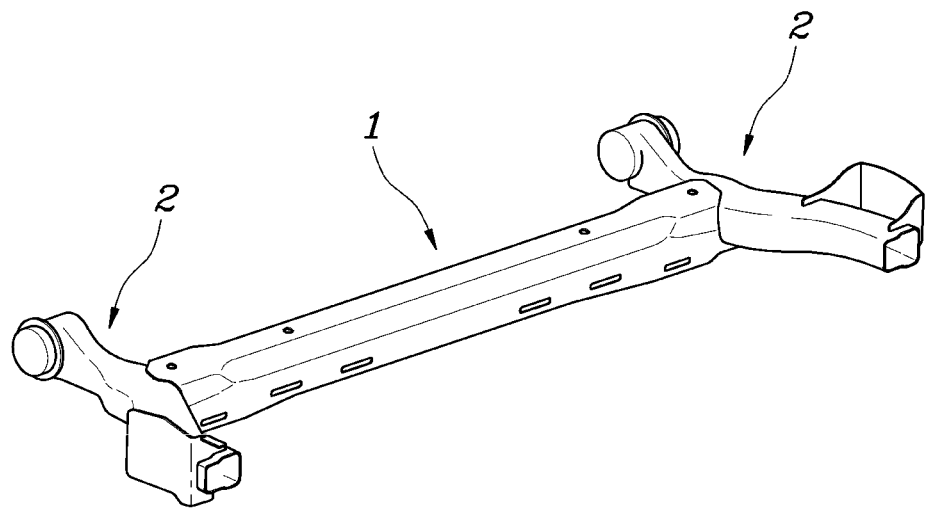
FIG. 1 is a view exemplarily illustrating a shape of a coupled torsion beam axle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Various exemplary embodiments of the present invention will be described in detail with reference to the accompanying drawings.

FIG. 1 is a view exemplarily illustrating a coupled torsion beam axle according to various exemplary embodiments of the present invention.

Referring to FIG. 1, a torsion beam 1 is formed in a 'U'-shaped cross-section open downward, so that both end portions of the torsion beam 1 are configured to be disposed in the left and right directions of a vehicle body, a pair of trailing arms 2 are respectively coupled to both end portions of the torsion beam 1, and both end portions of the trailing arms 2 are configured to be disposed in the front and rear direction of the vehicle body.

Furthermore, although not illustrated in FIG. 1, a rear wheel is coupled to the outside of a rear end portion of the trailing arm 2, and a lower end portion of a shock absorber is coupled to the interior of the rear end portion of the trailing arm 2.

Meanwhile, the torsion beam 1 of the coupled torsion beam axle of the present invention is configured to include an external beam 10 and an internal beam 20.

Figure 2:
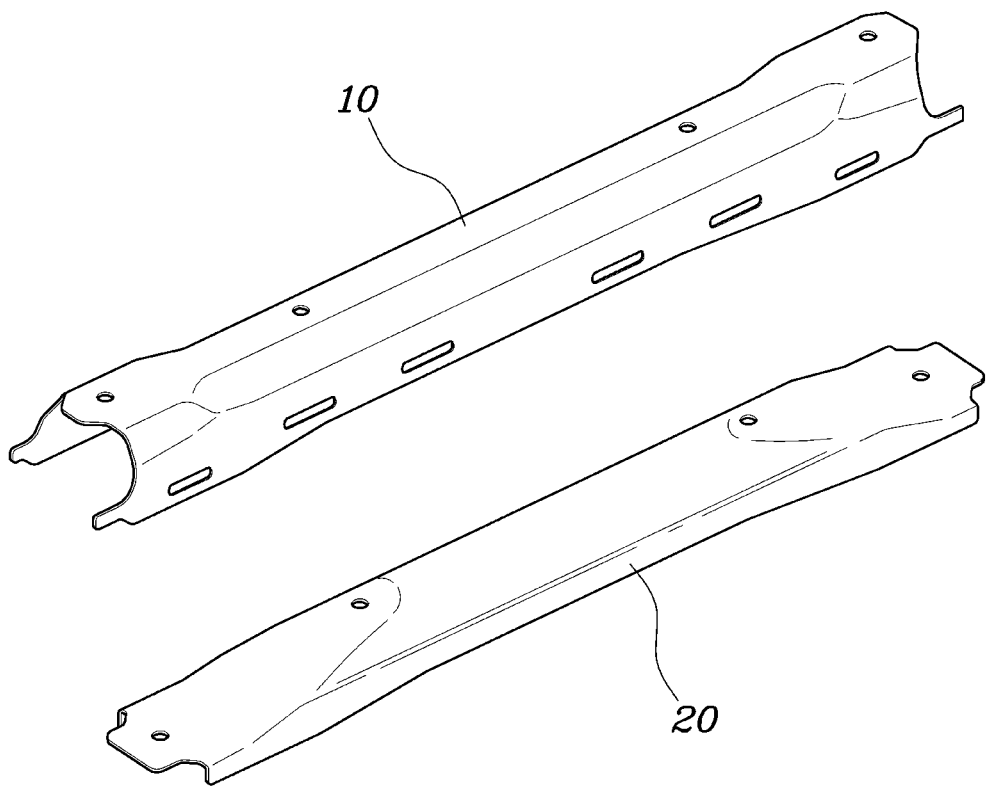
FIG. 2 is a view separately illustrating shapes of an external beam and an internal beam according to various exemplary embodiments of the present invention.
Figure 3:
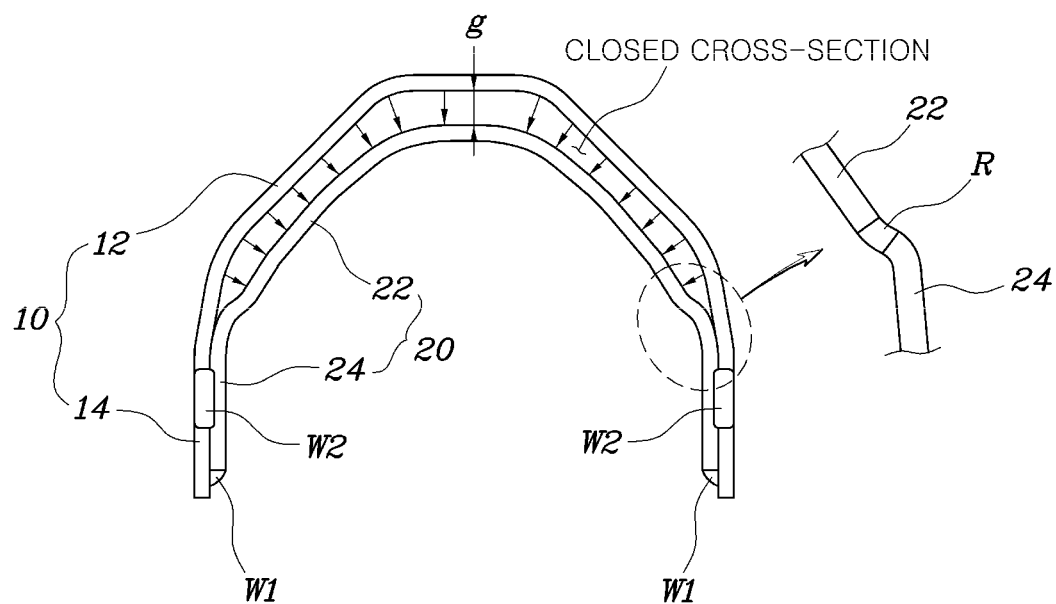
FIG. 3 is a view exemplarily illustrating a cross-sectional shape in which the external beam and the internal beam according to various exemplary embodiments of the present invention are coupled to each other.

FIG. 2 is a view separately illustrating shapes of an external beam 10 and an internal beam 20 according to various exemplary embodiments of the present invention and FIG. 3 is a view exemplarily illustrating a cross-sectional shape in which the external beam 10 and the internal beam 20 according to various exemplary embodiments of the present invention are coupled to each other.

Referring to FIG. 2 and FIG. 3, first, the external beam 10 is formed in a cross-sectional shape in which an external protrusion 12 of a middle end portion thereof is formed to protrude toward upward in a longitudinal direction of the external beam, and external skirt portions 14 are extended in a vertically longitudinal direction at both end portions of the external protrusion 12.

For example, the external protrusion 12 is formed in a cup shape in which an upper end portion thereof is horizontal and both horizontal end portions are inclined downwardly in an outward direction thereof, and is formed in a cross-sectional structure in which the external skirt portions 14 are formed in a straight line in a lower direction at a front end portion and a rear end portion of the external protrusion 12.

Furthermore, the internal beam 20 is formed in a cross-sectional shape in which an internal protrusion 22 of a middle end portion thereof is inserted into the external beam 10 to face the external protrusion 12, and internal skirt portions 24 are extended in a vertical direction at both end portions of the internal protrusion 22. Therefore, an external surface of the internal skirt portion 24 and an internal surface of the external skirt portion 14 are surface-bonded in a mutually matched state.

For example, the internal protrusion 22 is also formed in a cup shape in which a cross section protrudes upward, and is formed to a structure in which the internal skirt portions 24 are formed in the straight line in the lower direction at a front end portion and a rear end portion of the internal protrusion 22.

A gap g is formed between the external surface of the internal protrusion 22 and the internal surface of the external protrusion 12 to form a space of a closed cross-section between the external beam 10 and the internal beam 20.

That is, the external beam 10 and the internal beam 20 are separately provided through press molding of a plate material, and the internal protrusion 22 of the internal beam 20 is bonded in a form to be fitted into the external protrusion 12 of the external beam 10.

However, a gap g is formed along the external surface of the internal protrusion 22 and the internal surface of the external protrusion 12 to form a space of a closed cross-section between the external beam 10 and the internal beam 20. Furthermore, the external surface of the internal skirt portion 24 is bonded to the internal surface of the external skirt in a surface-contact state, increasing a bonding area between the external beam 10 and the internal beam 20.

Therefore, by implementing a closed cross-section structure on the cross-section of the beam where torsion occurs, a rigidity of the torsion beam 1 may be increased to secure a high roll rigidity equivalent to that of a multi-link, and furthermore, by increasing the bonding area between the external beam 10 and the internal beam 20, it is possible to secure durability performance of the torsion beam 1.

Furthermore, since the structure with increased durability and rigidity is not due to a structure with increased weight such as adding the torsion beam 1 or increasing the thickness of the torsion beam 1, a low weight design of the CTBA is also possible.

Furthermore, the internal beam 20 and the external beam 10 may be bonded by a linear welding bonding W1, and may also be bonded by applying a plug welding bonding W2 method together with the linear welding bonding W1.

Referring to FIG. 3, the welding bonding W1 is linearly performed along the end portion of the internal skirt portion 24 and the internal surface of the external skirt portion 14 contacting with the end portion of the internal skirt portion 24.

Furthermore, the external surface of the internal skirt portion 24 and the internal surface of the external skirt portion 14 may be patterned in the longitudinal direction and be additionally partial welding-bonded W2.

Since the external beam 10 and the internal beam 20 are press-molded, the welding may be performed in a state in which the surface matching between the external skirt portion 14 and the internal skirt portion 24 is not properly performed due to press molding tolerances, depending on production conditions.

In the instant case, in addition to the linear welding, the plug welding in which the bonding is partially performed is added to secure the surface matching between the external skirt portion 14 and the internal skirt portion 24, and as a result, it is possible to secure a quality of the welded portion, and since a vertical length of the external skirt portion 14 and the internal skirt portion 24 is increased to form a welded surface, it is possible to secure additional rigidity.

FIG. 4, FIG. 5, FIG. 6 and FIG. 7 are views illustrating examples of the plug welding in which patterns of a portion where the external beam 10 and the internal beam 20 according to various exemplary embodiments of the present invention are bonded are different, and the presence or absence, position and length of the plug welding may be set by diversifying according to target rigidity and durability weakness.

Figure 4:
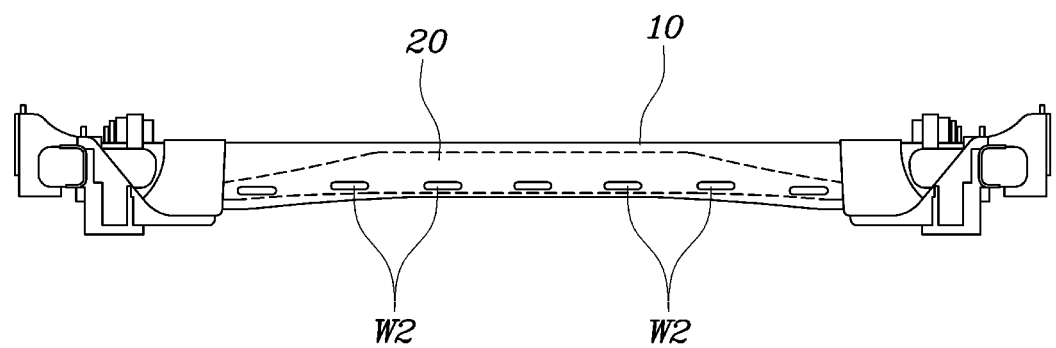
FIG. 4, FIG. 5, FIG. 6 and FIG. 7 are views illustrating examples in which patterns of a portion where the external beam and the internal beam according to various exemplary embodiments of the present invention are bonded are different.

FIG. 4 is a view for describing a first example of the plug welding, and the internal skirt portion 24 and the external skirt portion 14 are welding-bonded W2 at regular intervals in the longitudinal direction of the internal skirt portion 24 and the external skirt portion 14.

This may be a basic plug welding method of the external beam 10 and the internal beam 20.

Figure 5:
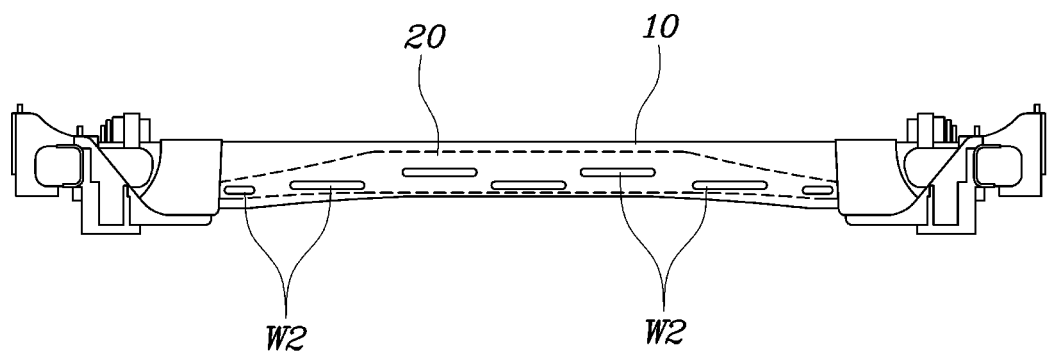

FIG. 5 is a view for describing a second example of the plug welding, and the internal skirt portion 24 and the external skirt portion 14 are welding-bonded W2 at regular intervals in upper and lower portions in the longitudinal direction of the internal skirt portion 24 and the external skirt portion 14 and may be bonded in a form in which welded positions of the upper and lower portions are staggered with each other.

This is a type for increasing the rigidity of the torsion beam 1, and when the length in the vertical direction of the external skirt portion and the internal skirt portion 24 is increased and the contact area thereof is increased, the surface-contact between the external skirt portion and the internal skirt portion 24 may be more reliably made by forming a form welded in a zig-zag shape at the upper and lower positions of the external skirt portion and the internal skirt portion 24, and it is possible to further increase the rigidity of the torsion beam 1 by increasing the amount of material to secure the contact area.

Figure 6:
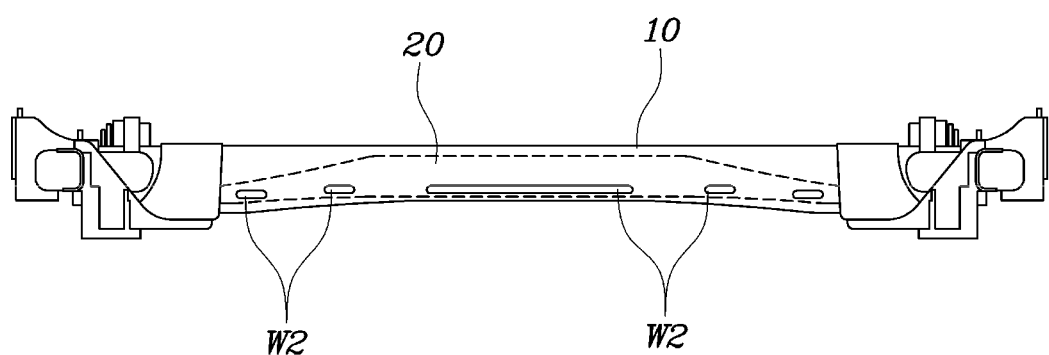

FIG. 6 is a view for describing a third example of the plug welding, and the internal skirt portion 24 and the external skirt portion 14 are welding-bonded W2 in the longitudinal direction of the internal skirt portion 24 and the external skirt portion 14 and may be bonded so that welded range of a center portion is longer than other welded ranges on both sides of the center portion of the torsion beam.

Since torsion of the torsion beam 1 due to torsion becomes excessive when a wheel stroke is large, the present reinforces a portion where durability may be weakened by configuring the center portion of the torsion beam 1 to have large resistance against the torsion.

Figure 7:
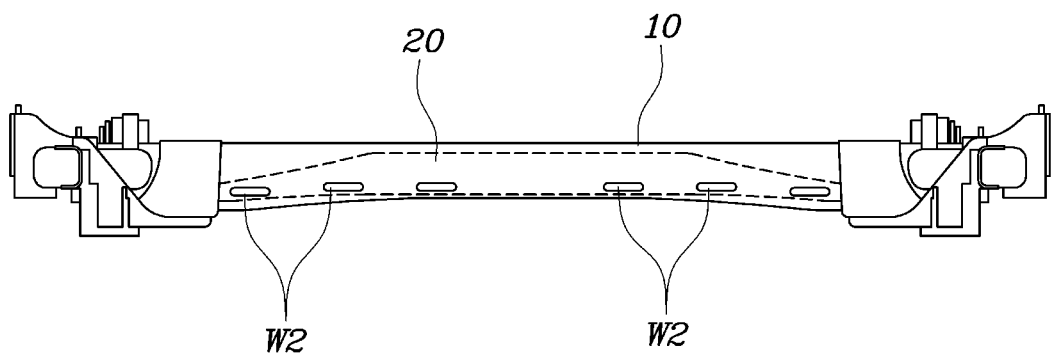

FIG. 7 is a view for describing a fourth example of the plug welding, and the internal skirt portion 24 and the external skirt portion 14 are welding-bonded W2 in the longitudinal direction of the internal skirt portion 24 and the external skirt portion 14 and may not be welded at the center portion of the torsion beam, but be welding-bonded W2 only at both sides of the center portion of the torsion beam.

That is, depending on a thickness of the torsion beam 1, the degree of deformation by plug welding heat is different. In a case in which the internal beam 20 and the external beam 10 are molded by use of a thin plate material to reduce the weight of the torsion beam 1, since the welding is not performed at the center portion of the torsion beam 1, it is possible to minimize thermal deformation.

Meanwhile, as illustrated in FIG. 3, according to various exemplary embodiments of the present invention, a gap g may be formed by offsetting the cross section of the internal protrusion 22 into a shape corresponding to the cross section of the external protrusion 12.

Here, the gap g is formed between the entire external surface section of the internal protrusion 22 and the entire internal surface section of the external protrusion 12, and this may be applicable to a middle portion of the external beam 10 and the internal beam 20 (the same cross-sectional section to be described later) based on the left and right directions of the vehicle body.

That is, in the case in which the torsion occurs at the torsion beam 1, since the deformation of the center portion is the largest, the roll rigidity may be improved by regulating an offset amount of the gap g formed in the center portion of the torsion beam.

Furthermore, a structure in which a front surface of the external surface of the internal skirt portion 24 is in surface-contact with the internal surface of the external skirt portion is formed.

That is, by securing a vertical length of the internal skirt portion 24 as long as possible while forming a vertical length of the external skirt portion 14 to be a length covering the internal skirt portion 24 to increase the bonding area, when the torsion of the torsion beam 1 occurs, a phenomenon in which torsional stress is concentrated is prevented, increasing the durability performance of the torsion beam 1.

Meanwhile, according to various exemplary embodiments of the present invention, a concave inflection portion R in which a direction of bending thereof changes toward an internal side of the internal beam 20 may be formed at a point where the external surface of the internal protrusion 22 and the external surface of the internal skirt portion 24 are connected.

For example, an upper end portion of the inflection portion R is connected to the lower end portion of the internal protrusion 22, a lower end portion of the inflection portion R is connected to an upper end portion of the internal skirt portion 24, and a middle portion of the inflection portion R is formed in a shape dug toward the internal side of the internal beam 20.

That is, in a case in which the inflection portion R is not formed at a portion where the internal protrusion 22 and the internal skirt portion 24 are connected, a gap g formed between the portion where the internal protrusion 22 and the internal skirt portion 24 are connected and the internal surface of the external beam 10 is narrowed, and as a result, not only is there a limit to securing rigidity in the corresponding portion, but also a coating performance deteriorates.

Therefore, according to various exemplary embodiments of the present invention, as the inflection portion R is formed at the point where the internal protrusion 22 and the internal skirt portion 24 are connected, the gap g between the inflection portion R and the internal surface of the external beam 10 is increased to additionally secure the rigidity of the torsion beam 1, as well as to secure coating flowability, improving the coating performance.

In an exemplary embodiment of the present invention, the inflection portion R may be formed to have a predetermined curvature.

Figure 8:
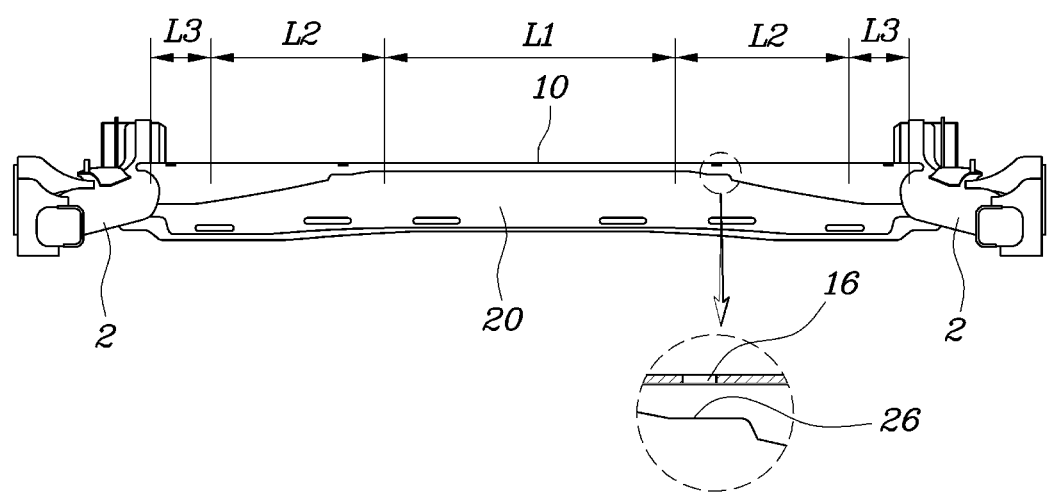
FIG. 8 is a view for describing a state in which a shape of a closed cross-section formed between the external beam and the internal beam according to various exemplary embodiments of the present invention is changed.

Meanwhile, FIG. 8 is a view for describing a state in which a shape of a closed cross-section formed between the external beam 10 and the internal beam 20 according to various exemplary embodiments of the present invention is changed.

Referring to FIG. 8, the same cross-sectional section L1 formed by maintaining the same shape of the closed cross-section is formed at the center portion of the external beam 10 and the internal beam 20 formed along the left and right directions of the vehicle body, and variable cross-sectional sections formed by varying the shape of the closed cross-section are formed at both sides of the same cross-sectional section L1.

That is, when the torsion occurs in the torsion beam 1, the center portion in which deformation is most likely to occur forms and maintains the same cross-sectional shape of the closed cross-sectional structure, and the variable cross-sections of the closed cross-sectional structure are formed to improve bonding property with the trailing arms 2 at both sides of the center portion of the torsion beam.

The variable cross-sectional section are classified into a first variable section L2 and a second variable section L3, and the first variable section L2 is configured so that one side thereof is connected to a side portion of the same cross-sectional section L1, and the upper end portion of the internal beam 20 is gradually inclined downward to gradually increase a vertical height of the closed cross-section.

The second variable section L3 is configured so that one side thereof is connected to the other side of the first variable section L2, the upper end portion of the external beam 10 and the upper end portion of the internal beam 20 are formed in a horizontal cross-sectional shape having a width of a predetermined length or more, and the other side thereof is connected to the side surfaces of the trailing arms 2.

Furthermore, in the case of the second variable section L3, the end portions of the external beam 10 and the internal beam 20 are formed in a shape surrounding a portion of the side surfaces of the trailing arms 2, and an upper end portion of the end portion of the external beam 10 is bonded to the upper surfaces of the trailing arms 2.

Furthermore, an upper end portion of the end portion of the internal beam 20 is bonded to bottom surfaces of the trailing arms 2.

That is, the same cross-sectional section L1 is the maximum torsion point of the torsion beam 1, and the torsional rigidity of the torsion beam 1 is secured by maintaining the shape and area of the closed cross-section between the internal beam 20 and the external beam 10 the same.

However, in the first variable section L2, it is possible to increase the lengths of the upper and lower portions of the closed cross-sectional shape such that the end portions of the internal beam 20 and the external beam 10 surround side circumferences of the trailing arms 2, and also increase a width in the front and rear direction thereof. To this end, in the first variable section L2, the length of the lower end portion of the external skirt portion 14 may be formed to extend downward while molding the upper end portion of the external protrusion 12 upward, and the length of the lower end portion of the internal skirt portion 24 may be formed to extend downward while forming the upper end portion of the internal protrusion 22 downward.

Furthermore, since the internal beam 20 and the external beam 10 in the second variable section L3 have a horizontal cross-sectional shape of the upper end portions formed wider than the internal beam 20 and the external beam 10 in the first variable section L2, the area to be bonded to the upper and lower surfaces of the trailing arms 2 is widened, improving welding robustness with the trailing arms 2.

Furthermore, according to various exemplary embodiments of the present invention, a jig hole 16 may be formed in a variable cross-sectional section adjacent to the same cross-sectional section L1 of the upper end portion of the external beam 10, and the jig hole 16 may be formed at a position where the first variable section L2 starts in the same cross-sectional section L1.

Furthermore, a seating surface 26 may be formed on the upper end portion of the internal beam 20 facing the jig hole 16 in a direction perpendicular to an axial direction of the jig hole 16.

Accordingly, through the jig hole 16, it is possible not only to perform fixing during welding, but also to measure a gap between the external beam 10 and the internal beam 20.

However, when the torsion of the torsion beam 1 occurs, the deformation in the same cross-sectional section L1 is the largest, and therefore, when the jig hole 16 is positioned in the same cross-sectional section L1, there is a possibility that a durability crack occurs in the jig hole 16. Therefore, by forming the jig hole 16 while avoiding the same cross-sectional section L1, it is possible to measure the gap between the external beam 10 and the internal beam 20 while preventing the crack of the torsion beam 1.

According to various exemplary embodiments of the present invention, by implementing a wide closed cross-section structure on the cross-section of the torsion beam 1 where torsion occurs, the rigidity of the CTBA may be increased to secure the high roll rigidity equivalent to that of the multi-link, and furthermore, by increasing the bonding area between the external beam 10 and the internal beam 20, it is possible to secure the manufacturability and durability performance of the torsion beam 1.

Furthermore, since the structure with increased durability and rigidity is not due to a structure with increased weight such as adding the torsion beam 1 or increasing the thickness of the torsion beam 1, the low weight design of the CTBA is also possible.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A torsion beam of a coupled torsion beam axle, the torsion beam comprising:
    an external beam having a first cross-section in which an external protrusion of a middle end portion of the external beam is formed to protrude toward upward in a longitudinal direction of the external beam, and external skirt portions are vertically extended along the longitudinal direction at a first end portion and a second end portion of the external protrusion; and
    an internal beam having a second cross-section in which an internal protrusion of a middle end portion in the internal beam is inserted into the external beam to face the external protrusion of the external beam, and internal skirt portions are vertically extended at a first end portion and a second end portion of the internal protrusion, and each external surface of the internal skirt portions and each internal surface of the external skirt portions are surface-bonded in a mutually matched state,
    wherein a gap is formed between an external surface of the internal protrusion and an internal surface of the external protrusion to form a closed cross-section between the external surface of the internal protrusion and the internal surface of the external protrusion,
    wherein each external surface of the internal skirt portions and each internal surface of the external skirt portions are partially welded in the longitudinal direction, and,
    wherein each external surface of the internal skirt portions and each internal surface of the external skirt portions are welded at predetermined intervals in the longitudinal direction of the internal skirt portions and the external skirt portions.

2. The torsion beam of claim 1, wherein a welding bonding is linearly performed along each end portion of the internal skirt portions and each internal surface of the external skirt portions contacting with each end portion of the internal skirt portions.

3. The torsion beam of claim 1, wherein each external surface of the internal skirt portions and each internal surface of the external skirt portions are welded at predetermined intervals in upper and lower portions of the external skirt portions and the internal skirt portions in a longitudinal direction of the internal skirt portions and in a longitudinal direction of the external skirt portions, and are bonded so that welded positions of the upper and lower portions are staggered with each other.

4. The torsion beam of claim 3, wherein the upper and lower portions of the external skirt portions and the internal skirt portions are bonded in a zig-zag order in the upper and lower portions.

5. The torsion beam of claim 1, wherein each external surface of the internal skirt portions and each internal surface of the external skirt portions are welded in longitudinal directions of the internal skirt portions and the external skirt portions, and are bonded so that a welded range of a center portion of the torsion beam is longer than other welded ranges at a first end side and a second end side of the center portion of the torsion beam.

6. The torsion beam of claim 1, wherein each external surface of the internal skirt portions and each internal surface of the external skirt portions are welded in longitudinal directions of the internal skirt portions and the external skirt portions, and are not welded at a center portion of the torsion beam, but are welded at a first end side and a second end side of the center portion of the torsion beam.

7. The torsion beam of claim 1, wherein the gap is formed by offsetting a cross section of the internal protrusion into a shape corresponding to a cross section of the external protrusion.

8. The torsion beam of claim 1, wherein the gap is formed between an entire external surface section of the internal protrusion and an entire internal surface section of the external protrusion.

9. The torsion beam of claim 1, wherein a front surface of each external surface of the internal skirt portions is in contact with each internal surface of the external skirt portions.

10. The torsion beam of claim 1, wherein a concave inflection portion in which a direction of bending thereof changes toward an internal side of the internal beam is formed at a point where the external surface of the internal protrusion and each external surface of the internal skirt portions are connected.

11. The torsion beam of claim 1,
wherein a same cross-sectional section formed by maintaining a same shape of a closed cross-section is formed at a center portion of the external beam and the internal beam, and
wherein variable cross-sectional sections formed by varying a shape of the closed cross-section are formed at a first end side and a second end side of the same cross-sectional section.

12. The torsion beam of claim 11, wherein the variable cross-sectional sections include:
a first variable section, wherein a first side of the first variable section is connected to a side portion of the same cross-sectional section, and an upper end portion of the internal beam is inclined downward to increase a vertical height of the closed cross-section, and
a second variable section, wherein a first side of the second variable section is connected to a second side of the first variable section, an upper end portion of the external beam and the upper end portion of the internal beam are formed in a horizontal cross-sectional shape having a width of a predetermined length or more, and a second side of the second variable section is connected to side surfaces of trailing arms.

13. The torsion beam of claim 12,
wherein end portions of the external beam and the internal beam are formed in a shape surrounding a portion of the side surfaces of the trailing arms,
wherein an upper end portion of the end portion of the external beam is bonded to upper surfaces of the trailing arms, and
wherein an upper end portion of the end portion of the internal beam is bonded to bottom surfaces of the trailing arms.

14. The torsion beam of claim 11, wherein a jig hole is formed in a variable cross-sectional section among the variable cross-sectional sections, which is adjacent to the same cross-sectional section of the upper end portion of the external beam.

15. The torsion beam of claim 14, wherein a seating surface is formed on an upper end portion of the internal beam facing the jig hole in a direction perpendicular to an axial direction of the jig hole.

* * * * *